United States Patent [19]

Ashcraft

[11] Patent Number: 5,681,518
[45] Date of Patent: Oct. 28, 1997

[54] PROCESS FOR MOLDING A FUEL RAIL ASSEMBLY

[75] Inventor: Timothy A. Ashcraft, Dover, Ohio

[73] Assignee: Handy & Harman Automotive Group, Dover, Ohio

[21] Appl. No.: 413,984

[22] Filed: Mar. 15, 1995

[51] Int. Cl.$^6$ ................................................ B29C 33/40
[52] U.S. Cl. ........................ 264/221; 264/317; 425/176
[58] Field of Search ............................ 264/221, 317, 264/DIG. 44; 425/176, DIG. 12; 123/456, 468, 469, 470

[56] References Cited

U.S. PATENT DOCUMENTS

| | | | |
|---|---|---|---|
| 4,296,063 | 10/1981 | Sendo et al. | 264/273 |
| 4,365,783 | 12/1982 | Kesling | 249/124 |
| 4,593,880 | 6/1986 | Smith et al. | 249/91 |
| 4,768,487 | 9/1988 | Yamamoto et al. | 123/468 |
| 4,771,751 | 9/1988 | Haigh et al. | 123/468 |
| 4,776,313 | 10/1988 | Freismuth et al. | 123/468 |
| 4,884,622 | 12/1989 | Jouguelet | 164/45 |
| 5,013,511 | 5/1991 | Akashi | 264/242 |
| 5,022,371 | 6/1991 | Daly | 123/468 |
| 5,062,405 | 11/1991 | Daly | 123/468 |
| 5,097,594 | 3/1992 | Daly et al. | 123/456 |
| 5,146,897 | 9/1992 | Hattori et al. | 123/470 |
| 5,156,124 | 10/1992 | Sugimoto et al. | 123/470 |
| 5,189,782 | 3/1993 | Hickey | 123/456 |
| 5,357,931 | 10/1994 | Semence | 123/470 |
| 5,411,001 | 5/1995 | Werner et al. | 123/468 |

FOREIGN PATENT DOCUMENTS 137894 3/1977 Japan.

OTHER PUBLICATIONS

David O. Kennedy, Structural-foam PPS manifolds for automotive engines, *Plastics Design Forum*, Jul./Aug. 1988.

L. De Keyzer, Fusible core technology: From research to industrialization, *Automotive Polymers & Design*, Aug. 1991.

*Primary Examiner*—Jan H. Silbaugh
*Assistant Examiner*—Suzanne E. Mason
*Attorney, Agent, or Firm*—Pennie & Edmonds, LLP

[57] ABSTRACT

A process for integrally molding an assembly having parts in a die lock situation, in a single modeling step, with the process steps of has the steps of providing a composite component with a predefined contour, molding a core fuel rail integrated with the composite component, connecting the core fuel rail to a main core structure, overmolding the combined core fuel rail and main core structure to form a finished assembly, removing and melting out the combined core fuel rail and main core structure and extracting the composite component to provide the finished assembly with a substantially accurate finish. The core fuel rails and injector pockets are molded together with the main manifold body in a single step although the injector pockets are in a die lock situation relative to the main manifold body. The interior surfaces of the injector pockets molded using the present invention have a substantially accurate finish.

17 Claims, 11 Drawing Sheets

PROCESS FOR MOLDING A FUEL RAIL ASSEMBLY

TECHNICAL FIELD

The present invention relates to a molding process utilizing meltable core materials in the manufacture of an assembly having a complex interior geometry creating die lock situations. The present invention particularly relates to a molding process for producing an air intake manifold with integrally formed fuel rails used in vehicles and to the manifolds thus produced.

BACKGROUND

In a molding process, die lock situations are commonly associated with the manufacture of assemblies having a complex internal geometry. A die lock refers to the situation where the geometry of one part in an assembly creates an interference in the mold with other parts of the same assembly that cannot be overcome by utilizing a slide or a core pull.

A typical solution to the above problem is to form the parts in a die lock situation separately before connecting them to obtain the assembly with the required configuration. Such additional processes not only increase manufacturing costs but also decrease product quality at the conjunction of the constituent parts. Another solution to avoid a die lock situation is redesigning such assemblies to other patterns with no die lock configurations. However, such changes usually result in more complicated designs of the assemblies which increase manufacturing costs.

Fusible cores have been adopted in molding processes to form any interior geometry of an assembly. A fusible core is a solid and dimensionally accurate metal insert having a low melting point. This fusible core is melted and removed after the formation of the assembly leaving behind the required interior geometry. However, due to the large amount of heat produced in the process of melting the core material, defects, such as deformation, cracks, etc., are usually formed on the finished surfaces of the assembly, thus affecting the quality of the finished surfaces.

It is therefore advantageous to obtain a molding process in which different parts of a die lock situation can be integrally formed in a single molding step. It is also advantageous to obtain a molding process which can not only produce an assembly having surfaces in die lock situations with its main body but also provide an accurate and defect-free finish to such surfaces.

SUMMARY OF THE INVENTION

The present invention relates to a molding process for a fuel rail assembly. The molding process includes the steps of providing a composite component with a predefined contour, molding a core fuel rail integrated with the composite component, connecting the core fuel rail to a main core structure, overmolding the combined core fuel rail and main core structure to form an overmolded assembly, and removing the core fuel rail, the main core structure and the composite component from the overmolded assembly to obtain the fuel rail assembly.

In the molding process of the present invention, the core fuel rail and main core structure are removed prior to removal of the composite component. In particular, the core fuel rail and the main core structure may be removed by melting and the composite component may be removed by extracting.

The core fuel rail is molded by injecting an alloy at a temperature between 325° F. and 500° F. and solidifying the alloy. The alloy used is preferably a tin/antimony/lead alloy or a tin/bismuth alloy. The injection time for the core fuel rail is about 5–15 seconds and the dwell time is about 15–30 seconds. The core mold is to be maintained at a temperature between about 40° F. and 110° F., and preferably between about 75° F. and 80° F.

The fuel rail assembly is overmolded with a composite material. The composite material is a polyamide or nylon copolymer which optionally is reinforced with glass fibers.

The molding process according to the present invention can be used to produce an air intake manifolds with integrally formed fuel rails.

The present invention also relates to a fuel rail assembly or a manifold thus produced. A manifold with an integrally formed fuel rail according to the present invention comprises a main manifold body, a fuel rail embedded in and extending around the main manifold body, and at least one injector pocket communicating with the fuel rail for connecting with fuel injectors. The fuel rail and the injector pocket are integrally formed with the main manifold body in a single molding step even though the injector pockets are in a die lock situation relative to the main manifold body. Moreover, the injector pockets have a substantially accurate finish which satisfies fuel injector requirements.

BRIEF DESCRIPTION OF THE DRAWINGS

These and other features, aspects, and advantages of the present invention will become much more apparent from the following description, appended claims, and accompanying drawings, in which:

DESCRIPTION OF THE PREFERRED EMBODIMENT

Figure 1:
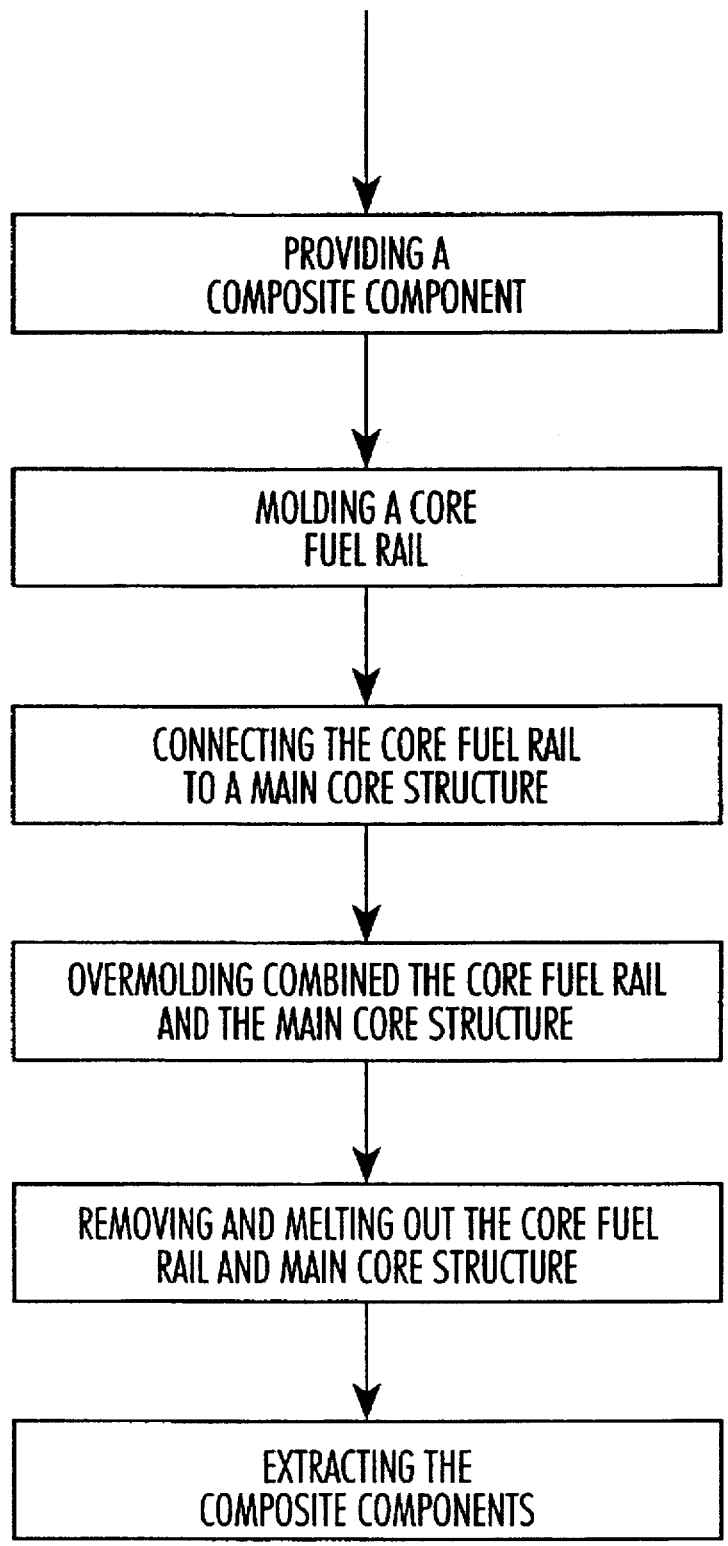
FIG. 1 is a flow chart describing the molding process of the present invention.

FIG. 1 illustrates the basic steps of a molding process for producing an assembly with integrally formed fuel rails according to the present invention. In the molding process, a core fuel rail is molded from a pre-prepared composite component. The formed core fuel rail is connected to a main core structure to form a combined core fuel rail and main core structure which constitutes the interior geometry of the assembly. The combined core fuel rail and main core structure is overmolded to form the assembly. The core fuel rail and main core structure are then melted out and removed from the assembly and, finally, the composite component is extracted from the finished assembly. The delayed extraction of the composite component ensures a substantially accurate finish of the molding surfaces as described hereinafter.

Figure 2:
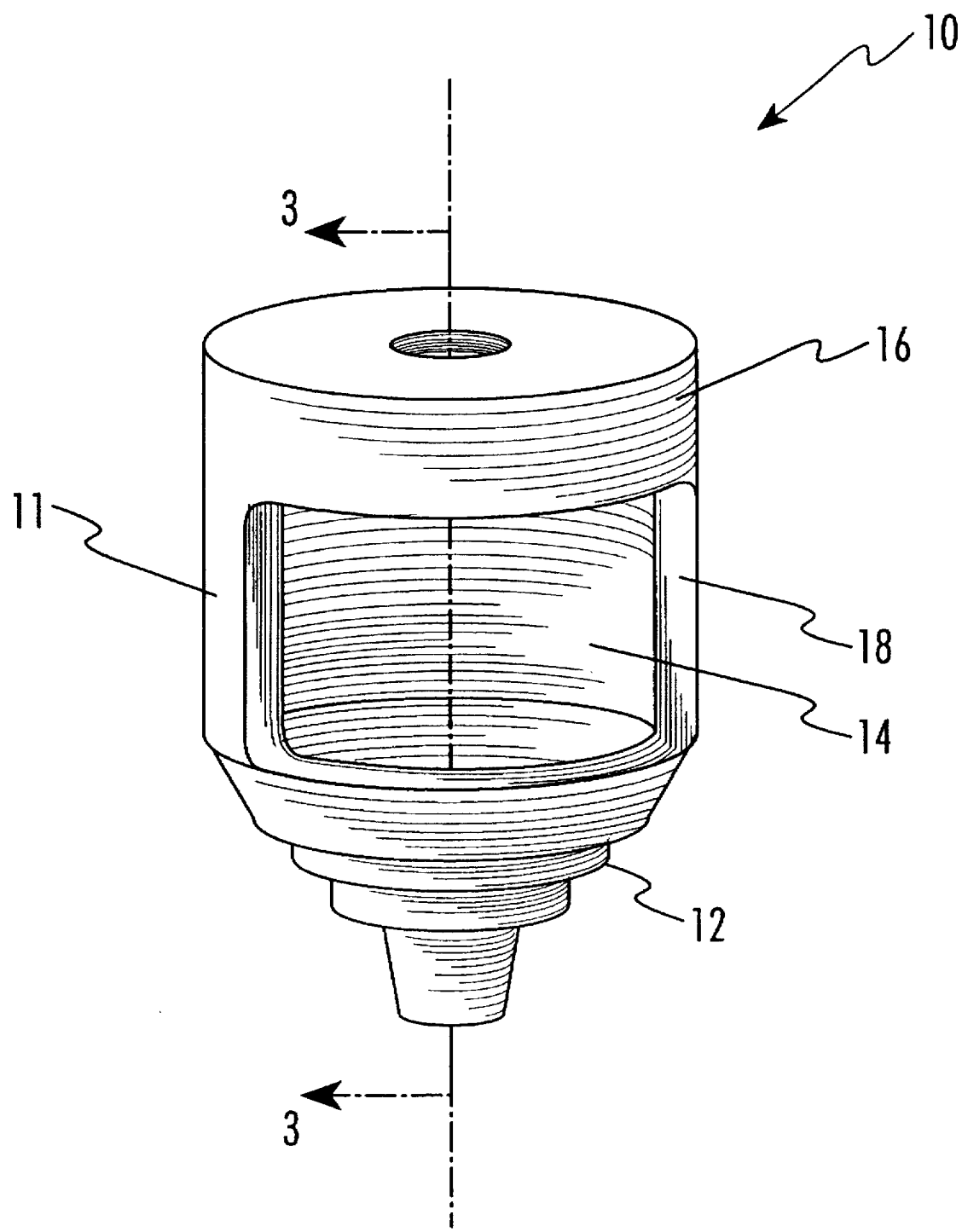
FIG. 2 is a perspective of a composite component to be integrated with the core fuel rail according to the present invention.
Figure 3:
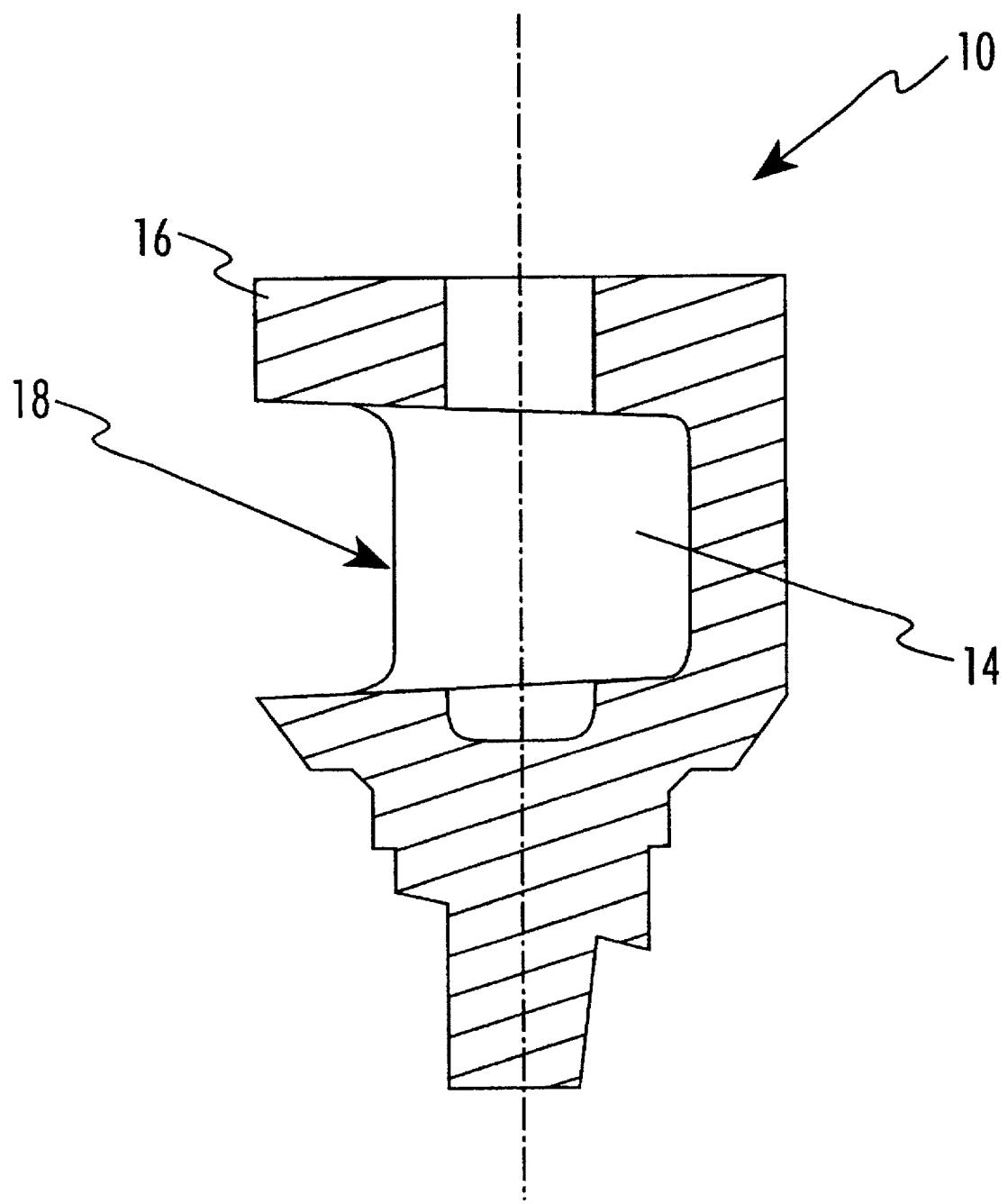
FIG. 3 is a cross-section of the composite component taken along line 3—3 in FIG. 2.

FIGS. 2 and 3 illustrate a composite component 10. The composite component 10 can be an injector pocket core used to form the interior surface of an injector pocket 102 on a manifold 100 (see FIG. 8). The composite component 10 has a cylindrical shape 11 in general, which is complementary to the interior of an injector pocket 102 on a manifold 100 (see FIG. 8). One end 12 of the composite component 10 is stepped in order to form a nozzle in the finished injector pocket 102 (see FIG. 8). The composite component 10 has an inside chamber 14 extending along its longitudinal direction and opening at the other end 16 thereof. The composite component 10 has an aperture 18 on its cylindrical peripheral 11 communicating with the inside chamber 14. The connection of the inside chamber 14 and the aperture 18 serves two important purposes in the molding process as described hereinafter. Firstly, during the process of forming an integrated core fuel rail 20 (see FIG. 5, the chamber 14 and the aperture 18 allow molten metal to flow therethrough into the core mold 40. Secondly, during the melting out process of the core fuel rail and main core structure as discussed in detail hereinafter, the chamber 14 and the aperture 18 allow molten metal in the fuel rail area to drain therethrough.

The composite component 10 can be made through various conventional methods. In a preferred embodiment, the composite component 10 is machined out of a steel or an aluminum blank depending upon the type of melt out system to be used. In another preferred embodiment, the composite component 10 is molded from a high temperature thermosetting plastic, such as polyphenyl sulphide (PPS) optionally reinforced with 40% glass fiber. Such polyphenyl sulphide resin has the advantage of allowing the composite component 10 to be very stable during the overmolding of lower melt index resins and the flowing of melted metal core at temperatures of 300° F. to 500° F. as described hereinafter. The stability ensures the interior surfaces of injector pockets 102 on the finished manifold 100 will have a substantially accurate finish as described hereinafter.

Figure 4:
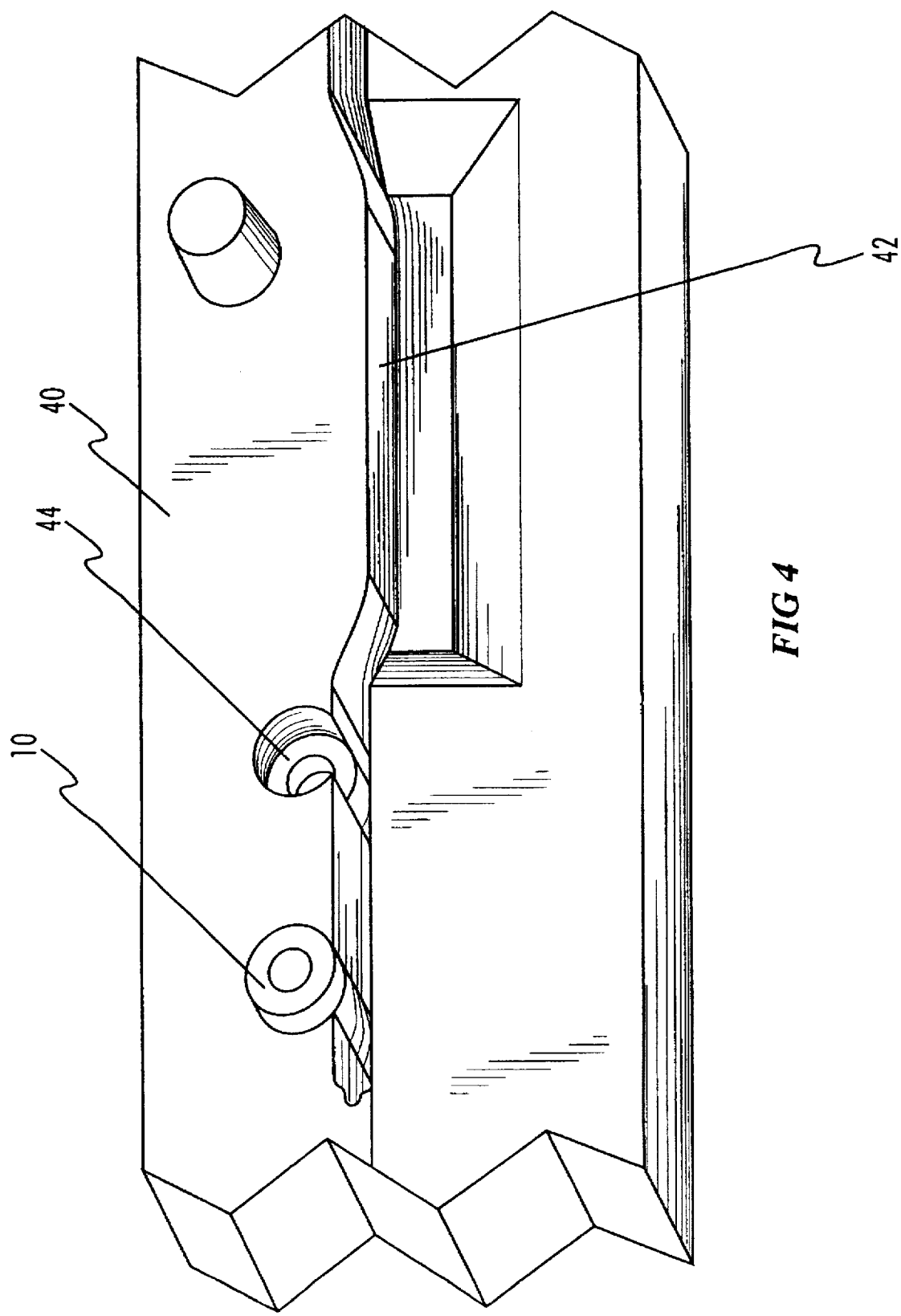
FIG. 4 shows the composite component in FIG. 2 being placed in a core mold.
Figure 5:
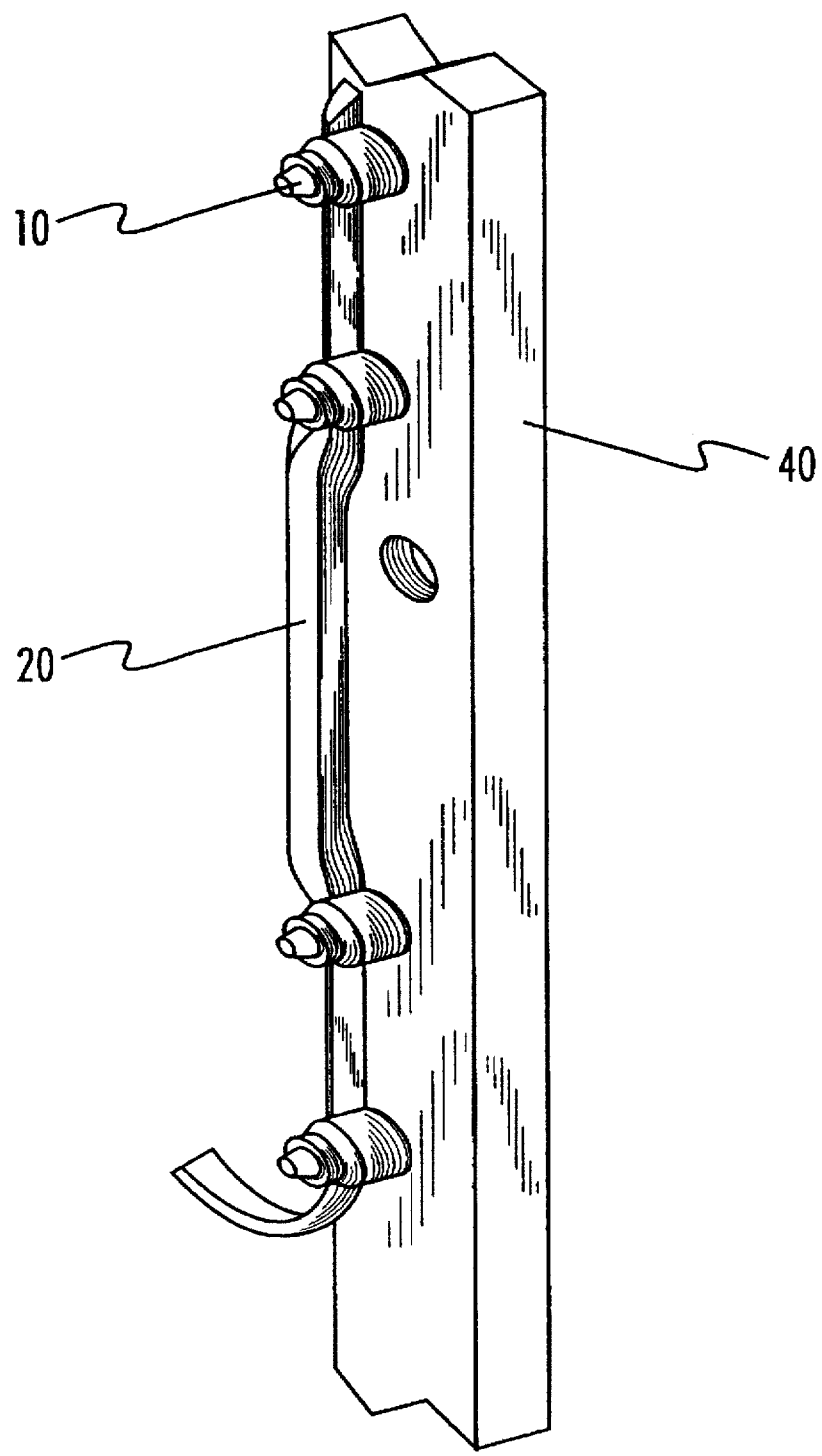
FIG. 5 shows the integrated core fuel rail being formed in the core mold.

FIGS. 4 and 5 show the formation of an integrated core fuel rail 20 in a core mold 40. In FIG. 4, only half of the core mold 40 is shown. The core mold 40 can be a conventional mold but has a cavity 42 in a shape complementary to a finished core fuel rail 20 for molding such a core fuel rail 20 therein. The cavity 42 communicates with at least one recess 44 for containing the composite component 10 therein. In a preferred embodiment, there are eight recesses 44 provided in the core mold 40. The composite components 10 as described hereinabove are to be placed in the core mold 40 in the recesses 44 as shown in FIG. 4. In a preferred embodiment, eight composite components 10 can be loaded into the core mold 40 through various loading means, e.g., by hand. The inside chambers 14 of the composite components 10 are oriented to communicate with the cavity 42 via the apertures 18 after the composite components 10 are placed in the recesses 44. Therefore, a core material can flow from the chamber 14 into the cavity 42 during the molding of the core fuel rail 20.

After loading the composite components 10, the core mold 40 is closed and a core material can flow into the core mold 40 to form the core fuel rail 20. The core material enters into the core mold 40 through the chambers 14 on composite components 10 and then flows through the composite components 10 to fill the cavity 42 as well as the inside chambers 14 of the composite components 10. The core material forms the core fuel rail 20 and integrates the composite components 10 with the core fuel rail 20 after it is solidified.

The core material used for molding an integrated core fuel rail 10 and 20 can be any metallic fusible core material. Metallic fusible core materials can be injected into the core mold 40 at a temperature ranging from 325°–500° F. In a preferred embodiment, a tin/bismuth alloy is used for forming the core fuel rail 20. Such tin/bismuth alloy can be injected at a temperature between 325° F. and 350° F. In another preferred embodiment, a tin/antimony/lead alloy is used for molding the core fuel rail 20 which is injected at a temperature of about 425° F. Other alloys which have melting temperatures in the above-stated temperature range can also be used, if desired.

The temperature of the core mold 40 is maintained at about 40° to 110° F., and preferably between 75° and 80° F., in the process of molding the core fuel rail 20. Since the temperature of the core mold 40 is much lower than that of the core material, the core mold 40 chills and solidifies the core material.

The core mold 40 is opened when the core material is solidified. A molded core fuel rail 20 is shown in FIG. 5 with the composite components 10 still contained in the recesses 44 in the core mold 40. The molded core fuel rail 20 is to be removed from the core mold 40 and connected to a main core 50 to form a combined core fuel rail and main core structure 60 as described hereinafter (see FIG. 7).

There are unique considerations for injection volume vs. time relative to each design for the core fuel rail 20. In a preferred embodiment, injection time for the core fuel rail 20 is about 5 to 15 seconds and the dwell time, i.e., setup or cure time, is about 15 to 30 seconds. The complete cycle, including loading the composite components 10 into the core mold 40, opening and closing the core mold 40, and removing the core fuel rail 20 from the core mold 40, takes approximately 35 to 60 seconds.

Figure 6:
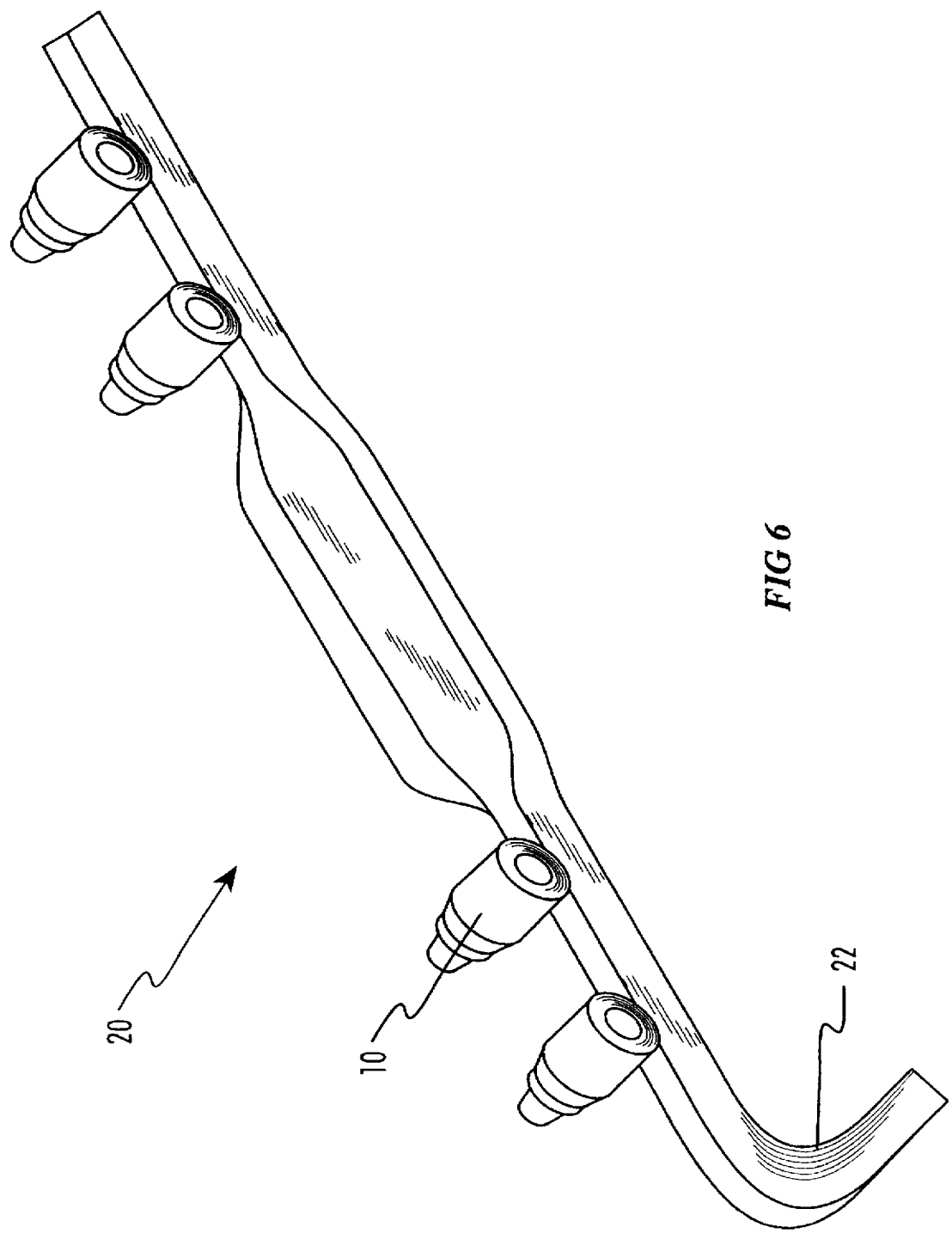
FIG. 6 is a perspective of an integrated core fuel rail according to the present invention.

FIG. 6 further illustrates the finished core fuel rail 20 integrated with the composite components 10. In a preferred embodiment, four composite components 10 are integrated with the core fuel rail 20 by means of the metal solidified in the chambers 14 and apertures 18 on the composite components 10. Such a core fuel rail 20 can form a fuel rail 104 inside a finished manifold 100 (see FIG. 11) after overmolding a combined core fuel rail and main core structure 60 as described hereinafter. The integrally formed fuel rail 104 further communicates with injector pockets 102 which are formed by the composite components 10. In a preferred embodiment, the core fuel rail 20 can have a bent end 22. When a pair of such core fuel rails 20 are used together, a joint core fuel rail (not shown) can be made. The joint core fuel rail can form an enclosed fuel rail (not shown) after the overmolding process for fuel to flow. The core fuel rail 20 can have various cross-sections designed according to the required fuel flow.

Figure 7:
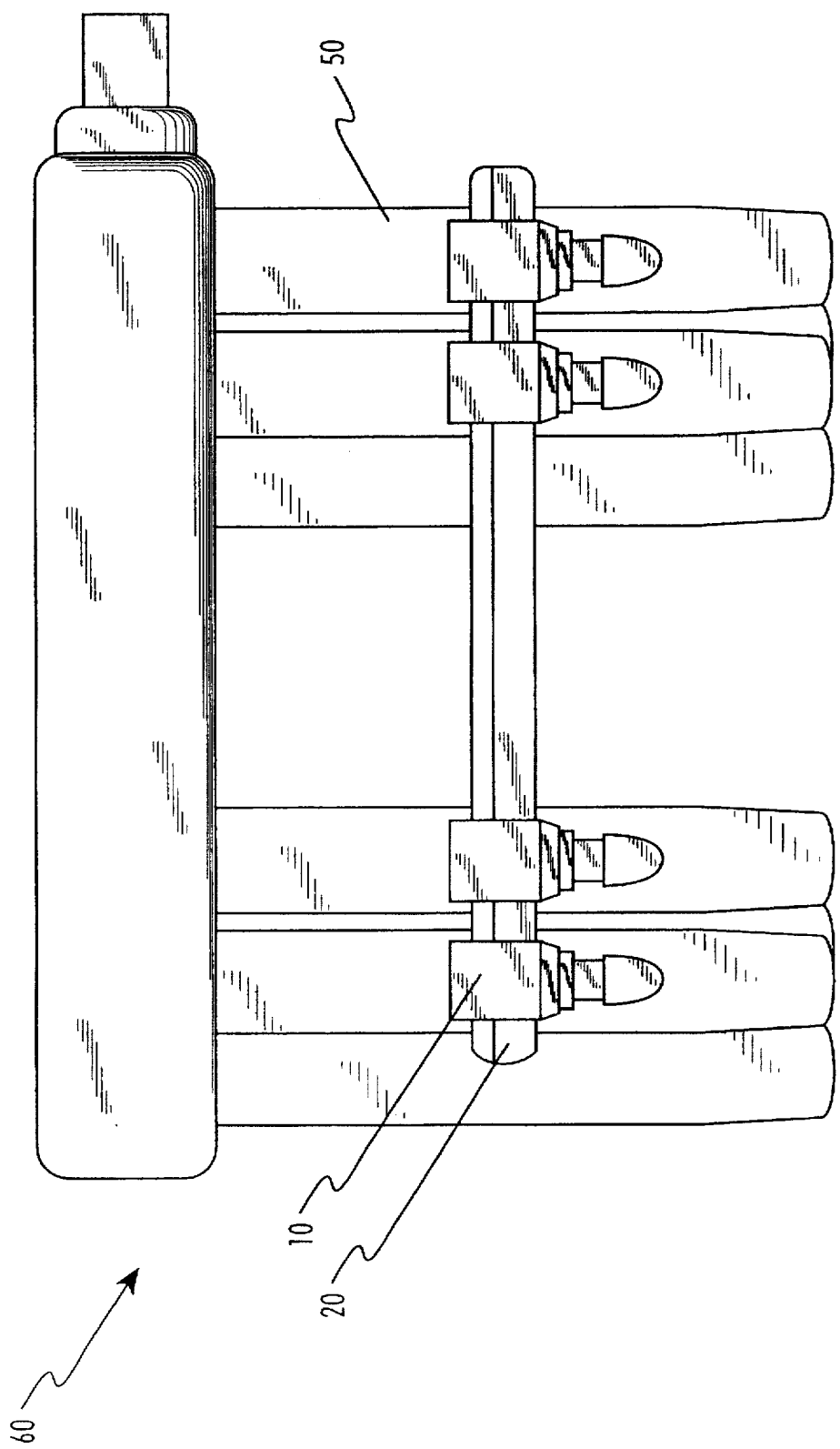
FIG. 7 shows the integrated core fuel rail in FIG. 6 being connected to a main core structure.

FIG. 7 shows a combined core fuel rail and main core structure 60 used to form the internal geometry of the manifold 100 to be molded. The combined core fuel rail and main core structure 60 comprises a main core structure 50 and the molded core fuel rail 20 as described hereinabove integrated with the main core structure 50 at each side thereof. The connection between the main core structure 50 and the core fuel rail 20 can be any conventional joining means. In a most preferred embodiment, the manifold 100 to be manufactured is a 454 C.I. fuel injected V-8 marine engine intake manifold manufactured by the Handy & Harman Automotive Group. The combined core fuel rail and main core structure 60 is constructed accordingly to form the interior of a specific engine.

The main core structure 50 can be made of any metallic fusible core material, and is preferably the same metallic fusible core material used for forming the core fuel rail 20. Therefore, the main core structure 50 can be melted out from the finished manifold 100 together with the core fuel rail 20. Choosing the same metallic fusible core material for both the main core structure 50 and the core fuel rail 20 allows them to be melted out together and avoids any fusion of dissimilar core materials in the molten bath. As noted above, preferred embodiments of the main core structure 50 are made of a tin/bismuth alloy or a tin/antimony/lead alloy depending on the specific metallic fusible core material used to form the core fuel rail 20. The main core structure 50 can be formed through conventional methods.

Figure 8:
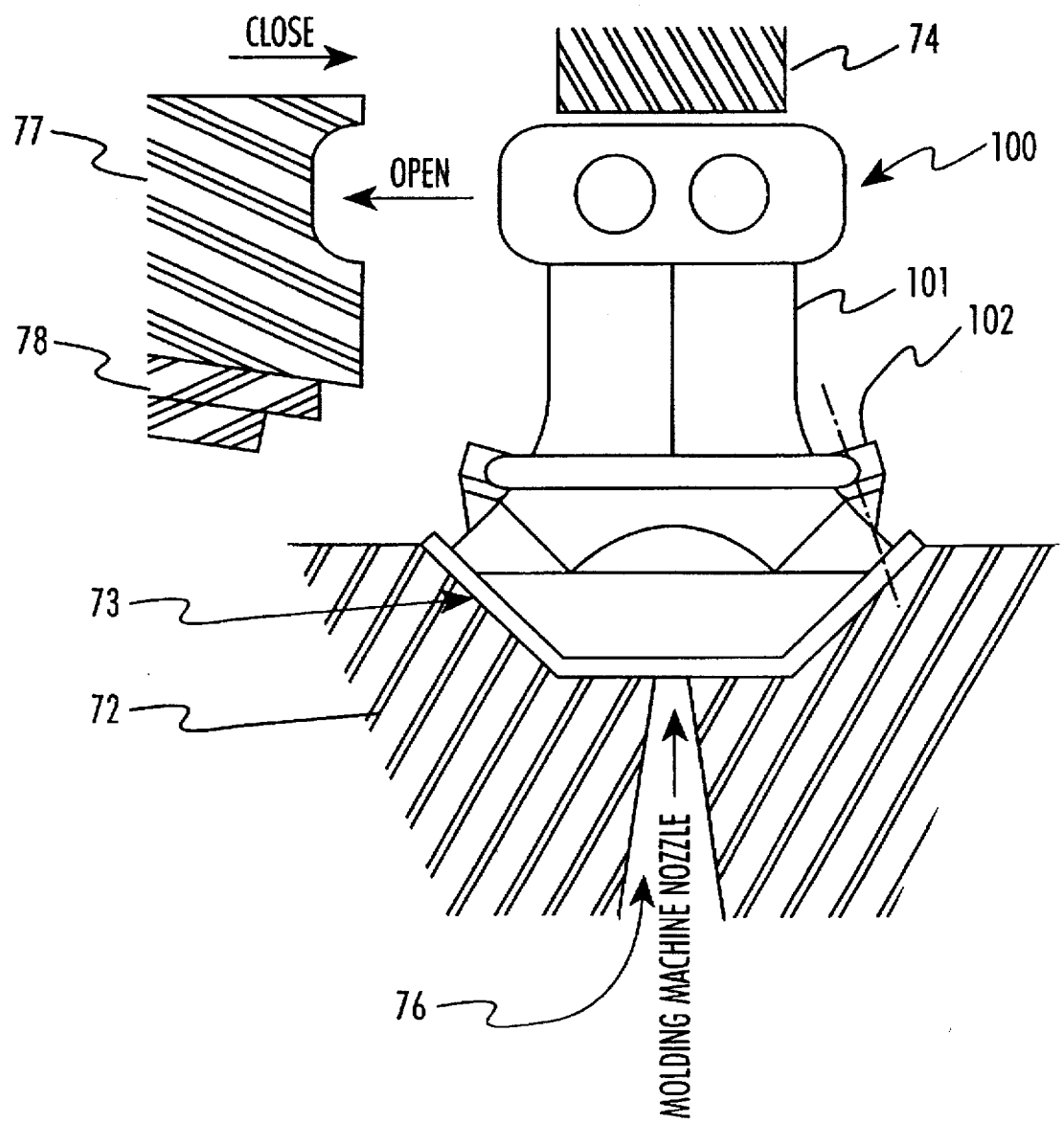
FIG. 8 is a cross-section of a molding machine with a molded manifold placed inside the molding machine.

FIG. 8 shows a cross-section of a molding machine and a molded manifold 100 seated inside the molding machine. The molding machine in FIG. 8 is seen in cross-section and comprises a base 72, a standing steel 74, first and second slides 77 and 78, a side support (not shown) and front and rear retainers (not shown). The combined core fuel rail and main core structure 60 is encompassed within the molded manifold 100. It can be seen that injector pockets 102 are formed on both sides of the manifold 100 leaning in towards the main manifold body 101 and creating die lock situations relative to the main manifold body 101.

The base 72 in the molding machine can be used to support the combined core fuel rail and main core structure 60 as well as the molded manifold 100. The base 72 can have a contoured supporting surface 73 on its top which is complementary to the bottom shape of the molded manifold 100. The contoured supporting surface 73 can be used as a mold for forming the bottom shape of the manifold 100 in the overmolding process. The molded manifold 100 can therefore be seated on the contoured supporting surface 73.

The standing steel 74 is supported above the base 72. The standing steel 74 can be movable relative to the base 72 to facilitate the loading of the combined core fuel rail and main core structure 60 as well as unloading of the molded manifold 100. The standing steel 74 assists the base 72 to hold the combined core fuel rail and main core structure 60 as well as the molded manifold 100 in position and restrains the same from any possible vertical movement in the overmolding process. In a preferred embodiment, both the base 72 and the standing steel 74 can be made of tool steel.

The first and second slides 77 and 78 in the molding machine are movable between their open positions and closed positions relative to the base 72. Each of the first and second slides 77 and 78 has a molding side facing towards the combined core fuel rail and main core structure 60. The molding sides of the first and second slides 77 and 78 can form a shape complementary to the exterior side of the finished manifold 100. Therefore, the molding sides of the first and second slides 77 and 78 can form the side shape of the manifold 100 in the overmolding process. There is a side support (not shown) on the opposite side of the molding machine. This side support has a mirror image structure of the two movable slides 77 and 78 so as to mate with the other side of the combined core fuel rail and main core structure 60. When the first and second slides 77 and 78 are in their closed positions, the two slides 77 and 78 and the side support can hold the combined core fuel rail and main core structure 60 as well as the molded manifold 100 in position along the longitudinal direction of the molding machine.

The front and rear retainers are connected as a part of the molding machine. Similar to the above description regarding the first and second slides 77 and 78 and the side support, the front and rear retainers have their molding sides facing towards the combined core fuel rail and main core structure 60. The shapes of the molding sides on the front and rear retainers are contoured to be complementary to the exterior shapes of the front and rear ends of the molded manifold 100. Therefore, the front and rear ends of the molded manifold 100 can be properly formed in the overmolding process. The front and rear retainers are to restrain the combined core fuel rail and main core structure 60 as well as the molded manifold 100 from moving in the radial direction of the molding machine.

An enclosed molding chamber can be formed by means of the contoured supporting surface 73 of the base 72 and the molding sides of the standing steel 74, the first and second slides 77 and 78, the side support and the front and rear retainers. Such a molding chamber forms the exterior geometry of a finished manifold 100. The combined core fuel rail and main core structure 60 can be placed in the enclosed molding chamber in the overmolding process for the manifold 100. It is understood that there is a space left between the interior of the molding chamber and the combined core fuel rail and main core structure 60 for filling in a molding material to form the finished manifold 100. In a preferred embodiment, a molding machine nozzle 76 is provided at the bottom of the molding machine for injecting a molding material into the molding machine.

In the overmolding process for the manifold 100, the combined core fuel rail and main core structure 60 is placed inside the molding chamber in the molding machine. After the combined core fuel rail and main core structure 60 is held in position, the first slide 77 advances to its closed position. Once the first slide 77 is closed, the second slide 78 advances to its closed position. The closed first and second slides 77 and 78 together with the side support, the base 72, the standing steel 74 and the front and rear retainers thus form an enclosed molding chamber. The combined core fuel rail and main core structure 60 can then be overmolded in the molding machine through any conventional molding process.

In a preferred embodiment, a molding material can be injected into the molding machine via the molding machine nozzle 76. The molding material fills the space between the molding chamber of the molding machine and the combined core fuel rail and main core structure 60 and forms the finished manifold 100 after it is solidified. The temperature at which such a molding material is injected into the molding machine depends on a number of factors, such as the assembly being molded, the type of molding material used, and the core geometry. In a preferred embodiment, the injection temperature ranges from 540°–600° F.

The molding material can be any thermoplastic material. Preferably, a composite material, such as an engineering plastic or a highly engineered resin, optionally containing glass or other reinforcement is chosen. The preferred engineering plastic used for overmolding the manifold 100 is a polyamide or nylon copolymer reinforced with glass fibers. Such materials are available from a variety of suppliers such as BASF and Dupont. Another useful composite material is a polyphenyl sulphide resin.

After the overmolding process is completed, the molding machine remains closed until the molding material is solidified to form the manifold 100. The solidification time of the molding material varies depending on a number of factors, such as the assembly being overmolded, the amount and kind of molding material being injected, and the geometry of the parts being overmolded. The solidifying procedure of the molding material can take between about 15 and 50 seconds, and preferably takes about 15 to 30 seconds.

When the manifold 100 is formed, the first and second slides 77 and 78 can be moved away from the finished manifold 100 back to their open positions to allow the finished manifold 100 to be removed from the molding machine. The combined core fuel rail and main core structure 60 still remains inside the finished manifold 100. In particular, the core fuel rail 20 forms a fuel rail 104 embedded in the finished manifold 100 while the composite components 10 form the injector pockets 102. The fuel rail 104 communicates with injector pockets 102.

The combined core fuel rail and main core structure 60 is then removed from the finished manifold 100. The removal of the combined core fuel rail and main core structure 60 can be carried out through convection or a combination of convection and induction. In a preferred embodiment, the combined core fuel rail and main core structure 60 is melted out from the finished manifold 100 by means of heat transfer media. Depending on the particular low temperature core material selected for forming the combined core fuel rail and main core structure 60, the temperature of the melting out process can range from 330° F. to 450° F. As a result of the stability of the polyphenyl sulphide resin, the composite components 10 still remain in their respective positions in such a melting out process. The melted metal drains through the apertures 18 and the chambers 14 in the composite components 10. By maintaining the composite components 10 inside the formed injector pockets 102 in the process for melting out the core material, possible deformation of the injector pockets 102 caused by heat from the melting core material is eliminated. Therefore, the injector pockets 102 can obtain a substantially accurate finish which satisfies fuel injector requirements.

Figure 9:
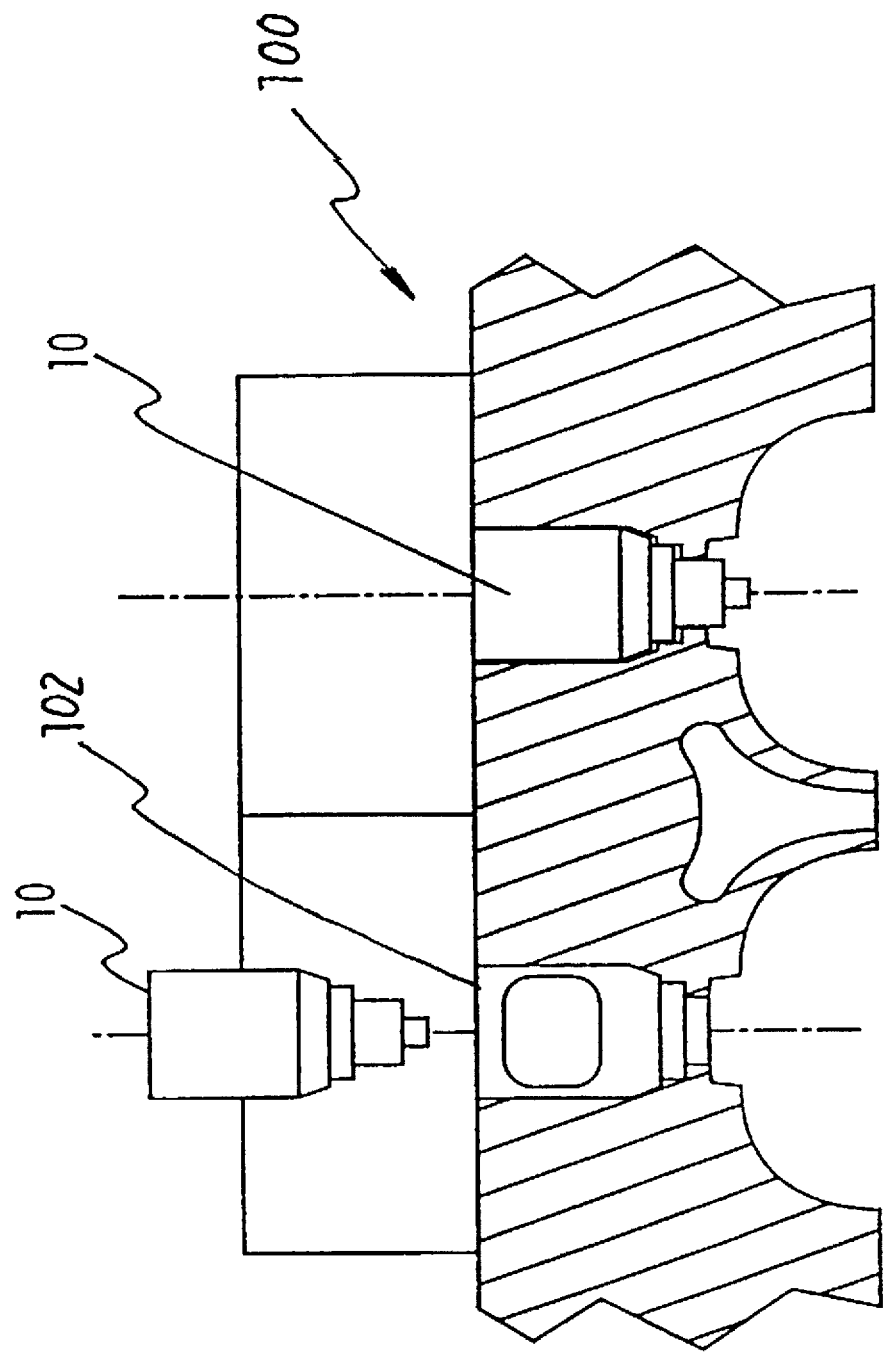
FIG. 9 is a cross-section of an assembly having two injector pockets formed by composite components.

FIG. 9 shows the extraction of composite components 10 from a finished manifold 100. Typically, the composite components 10 are used in molding a manifold 100 with integrally formed fuel rails 104 (see FIG. 11). The composite components 10 are to be extracted from the finished manifold 100 after the metallic fusible core material is completely melted and removed from the finished manifold 100. The final extraction of the composite components 10 ensures the required quality of interior surfaces of the injector pockets 102.

One of the injector pockets 102 is shown to have a defect-free finish after the composite components 10 have been extracted. Both the sealing area and the interior surface of the injector pocket 102 have a substantially accurate finish which satisfies fuel injector requirements. More importantly, the finish of the interior surfaces of the injector pockets obtained by the process of the present invention is highly repeatable in a manufacturing environment. The accurate finish in the sealing area of the injector pocket 102 ensures the engagement of the injector pocket 102 and a fuel injector (not shown).

The sealing between the injector pocket 102 and the fuel injector can be accomplished by various conventional means. In a preferred embodiment, O-rings (not shown) are used to seal the injector pocket 102 and the corresponding fuel injector. Such O-rings are designed to be able to maintain a maximum pressure of 85 psi.

Figure 10:
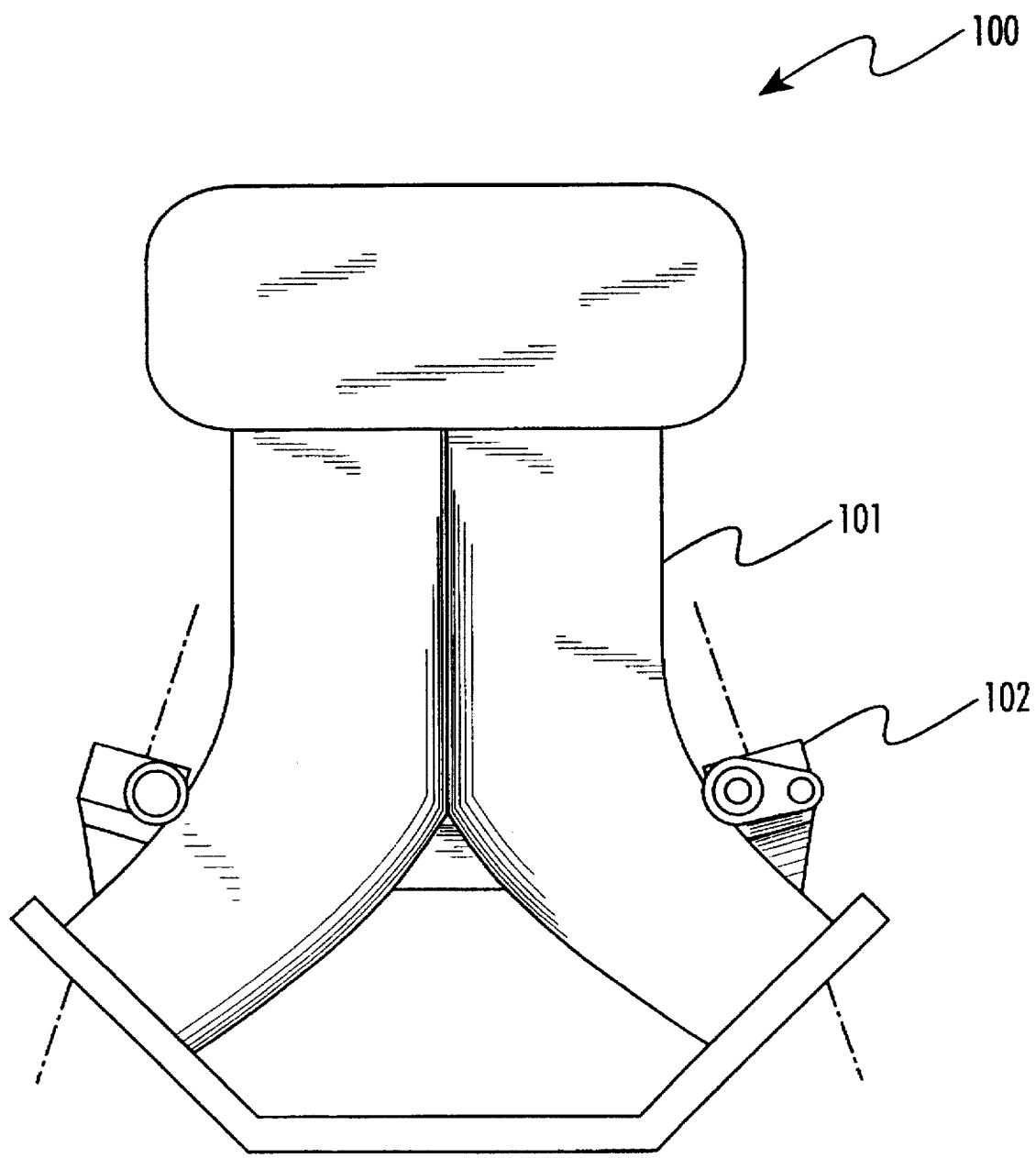
FIG. 10 is a rear view of a manifold formed according to the present invention.
Figure 11:
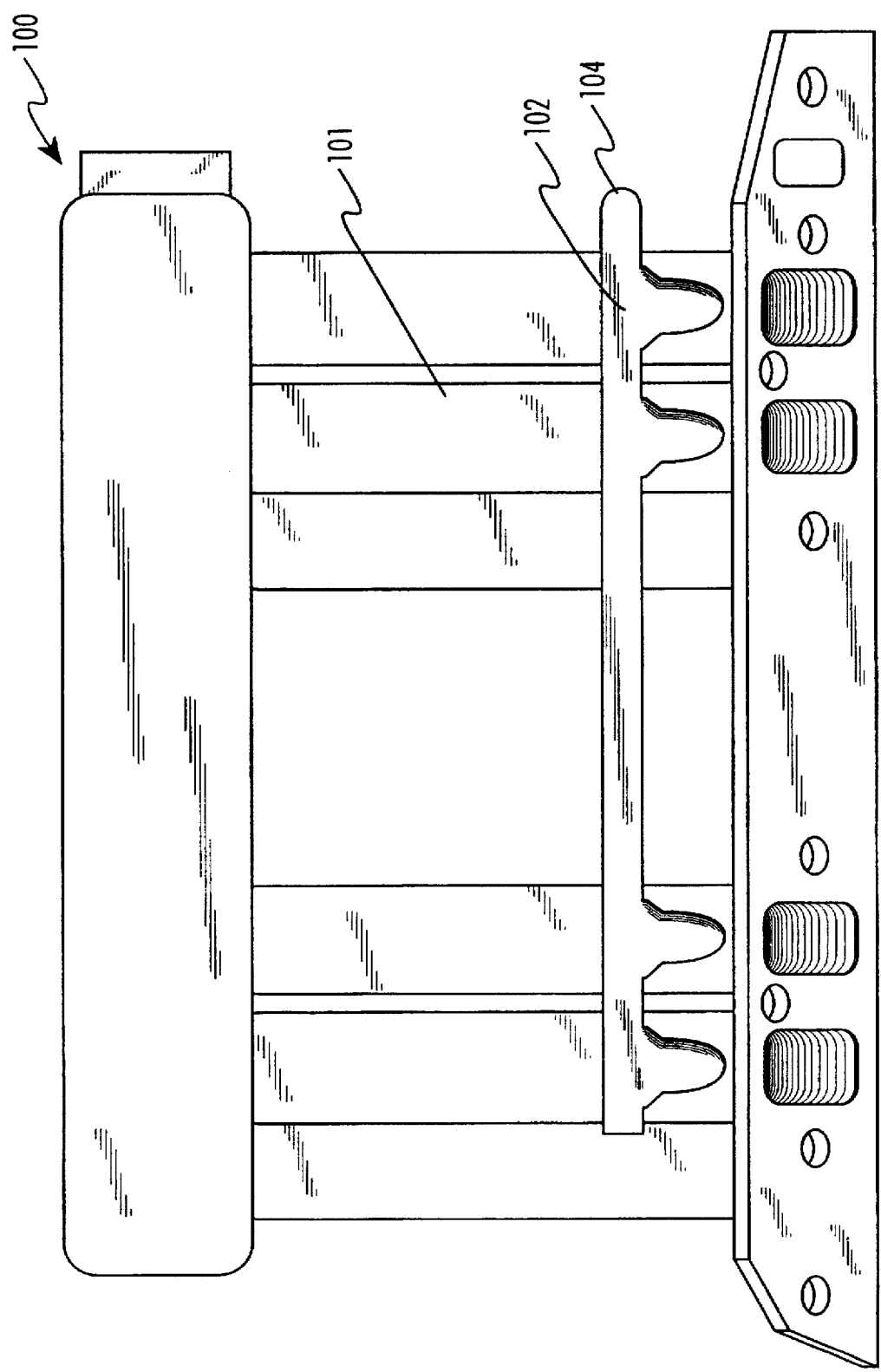
FIG. 11 is a side view of a manifold formed according to the present invention.

FIGS. 10 and 11 show a finished manifold 100 produced according to the molding process as described hereinabove. The integrally formed fuel rail 104 as shown in FIG. 11 is embedded in and goes completely around the finished manifold 100. In the most preferred embodiment, the manifold 100 is a 454 C. I. fuel injected V-8 marine engine intake manifold manufactured by the Handy & Harman Automotive Group. However, the present invention is not limited to such a specific marine engine application. The molding process as described hereinabove can be applied to make any intake manifold incorporating an integrally formed fuel rail.

The finished manifold 100 has a main manifold body 101. A fuel rail 104 integrates with the main manifold body 101 and extends around the main manifold body 101. At least one injector pocket 102 integrates with the main manifold body 101 and communicates with the fuel rail 104. The design allows for fuel transportation via a fuel rail to each injector incorporated into the manifold.

Despite the fact that the injector pockets 102 are in a die lock situation relative to the main manifold body 101, the fuel rail 104 and the injector pockets 102 are integrally formed with the main manifold body 101. Using a single molding step to form such a manifold 101 is economically efficient both from a manufacturing and design perspective. Moreover, the injector pockets 102 have an accurate finish on the interior surfaces as described above. Therefore, the engagement of the injector pockets 102 and the fuel injectors is ensured.

The present invention has been described in detail with particular emphasis on the preferred embodiments thereof. However, it should be understood that variations and modifications within the spirit and scope of the present invention may occur to those skilled in the art to which the invention pertains. Accordingly, all expedient modifications readily attainable by one versed in the art from the disclosure set forth herein that are within the scope and spirit of the present invention are to be included as further embodiments of the present invention. The scope of the present invention accordingly is to be defined as set forth in the appended claims.

What is claimed is:

1. A molding process for producing a fuel rail assembly comprising:

providing at least one composite component with a predefined contour;

molding a core fuel rail integrated with said composite component to form a core fuel rail assembly;

connecting said core fuel rail assembly to a main core structure to form a combined core fuel rail assembly and main core structure;

overmolding said combined core fuel rail assembly and main core structure to form an overmolded assembly; and removing said core fuel rail, said main core structure and said composite component from said overmolded assembly to obtain said fuel rail assembly.

2. The process of claim 1 wherein said core fuel rail and main core structure are removed prior to removal of said composite component.

3. The process of claim 2 wherein said core fuel rail and said main core structure are removed by melting and said composite component is removed by extraction.

4. The process of claim 3 wherein said core fuel rail is molded by injecting an alloy in a core mold at a temperature between 325° F. and 500° F. and solidifying said alloy in the form of said core fuel rail.

5. The process of claim 4 wherein an injection time for molding said core fuel rail is about 5 to 15 seconds and a dwell time is about 15 to 30 seconds.

6. A molding process of claim 5 wherein said core fuel rail is molded with a tin/antimony/lead alloy, said core mold being maintained at a temperature between 40° F. and 110° F.

7. A molding process of claim 5 wherein said core fuel rail is molded with a tin/bismuth alloy, said core mold being maintained at a temperature between 75° F. and 80° F.

8. A molding process of claim 1 wherein said fuel rail assembly is overmolded with a thermoplastic material.

9. A molding process of claim 8 wherein said thermoplastic material is a polyamide or nylon copolymer, optionally reinforced with glass fibers.

10. A molding process for producing an air intake manifold with an integrally formed fuel rail comprising:

providing at least one composite component with a predefined contour;

molding a core fuel rail integrated with said composite component to form a core fuel rail assembly;

connecting said core fuel rail assembly to a main core structure to form a combined core fuel rail assembly and main core structure;

overmolding said combined core fuel rail assembly and main core structure to form an overmolded assembly; and removing said core fuel rail, said main core structure and said composite component from said overmolded assembly to obtain said air intake manifold.

11. The process of claim 10 wherein said core fuel rail and main core structure are removed prior to removal of said composite component.

12. The process of claim 11 wherein said core fuel rail and said main core structure are removed by melting and said composite component is removed by extraction.

13. The process of claim 12 wherein said core fuel rail is molded by injecting an alloy in a core mold at a temperature between 325° F. and 500° F. and solidifying said alloy in the form of said core fuel rail.

14. The process of claim 13 wherein an injection time for molding said core fuel rail is about 5 to 15 seconds and a dwell time is about 15 to 30 seconds.

15. A molding process of claim 14 wherein said core fuel rail is molded with a tin/antimony/lead alloy or a tin/bismuth alloy, said core mold being maintained at a temperature between 40° F. and 110° F.

16. A molding process of claim 10 wherein said fuel rail assembly is overmolded with a thermoplastic material.

17. A molding process of claim 16 wherein said thermoplastic material is a polyamide or nylon copolymer, optionally reinforced with glass fibers.

* * * * *